United States Patent
Ikegami

(10) Patent No.: US 8,782,512 B2
(45) Date of Patent: Jul. 15, 2014

(54) CONTROLLER, METHOD, AND PROGRAM PRODUCT FOR CONTROLLING JOB INFORMATION DISPLAY, AND RECORDING MEDIUM

(75) Inventor: Munemitsu Ikegami, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1619 days.

(21) Appl. No.: 11/508,313

(22) Filed: Aug. 23, 2006

(65) Prior Publication Data

US 2007/0061760 A1    Mar. 15, 2007

(30) Foreign Application Priority Data

Aug. 25, 2005  (JP) .................................. 2005-244345

(51) Int. Cl.
 - *G06F 17/00* (2006.01)
 - *H04N 1/00* (2006.01)
 - *G06F 11/32* (2006.01)

(52) U.S. Cl.
CPC ...... *G06F 11/321* (2013.01); *H04N 2201/3202* (2013.01); *H04N 1/00323* (2013.01); *H04N 2201/0094* (2013.01); *H04N 2201/3212* (2013.01); *H04N 1/00344* (2013.01)
USPC .......................................... 715/228; 715/227

(58) Field of Classification Search
CPC .................................................... G06F 3/1238
USPC .......... 715/234, 220, 227, 243–246, 853, 228
See application file for complete search history.

(56) References Cited

U.S. PATENT DOCUMENTS

| | | | | |
|---|---|---|---|---|
| 5,588,099 A | * | 12/1996 | Mogilevsky et al. | .......... 715/273 |
| 5,873,659 A | | 2/1999 | Edwards et al. | |
| 5,923,013 A | * | 7/1999 | Suzuki et al. | .................. 235/375 |
| 5,950,168 A | * | 9/1999 | Simborg et al. | .................... 705/3 |
| 5,999,945 A | * | 12/1999 | Lahey et al. | ........................... 1/1 |
| 6,055,550 A | * | 4/2000 | Wallack | ........................ 715/229 |
| 6,616,359 B1 | * | 9/2003 | Nakagiri et al. | .............. 400/582 |
| 7,613,412 B2 | * | 11/2009 | Harada et al. | ................... 399/81 |
| 7,697,156 B2 | * | 4/2010 | Salgado | ....................... 358/1.15 |
| 7,800,773 B2 | * | 9/2010 | Richter et al. | ............... 358/1.15 |

(Continued)

FOREIGN PATENT DOCUMENTS

| | | |
|---|---|---|
| EP | 1 369 770 A1 | 12/2003 |
| EP | 1 501 008 A2 | 1/2005 |
| JP | 2002-7095 A | 1/2002 |

OTHER PUBLICATIONS

UCLA, Excel Pivot Tables, Published Oct. 2002, UCLA School of Medicine, 1-39.*

*Primary Examiner* — Manglesh M Patel
(74) *Attorney, Agent, or Firm* — Dickstein Shapiro LLP

(57) ABSTRACT

A controller for controlling a display of list information of one or more jobs executed in one or more apparatuses on a display unit is disclosed, wherein with respect to a specified one of display items of the list information of the jobs, the display items each having one or more classifications and having one or more attribute items determined independently for each of the classifications, a selection field for selecting one of the classifications is displayed; and the area of the specified one of the display items is expanded in accordance with the one of the classifications selected in the selection field, and the attribute items corresponding to the selected one of the classifications are displayed in the expanded area with respect to one or more of the jobs related to the selected one of the classifications.

16 Claims, 19 Drawing Sheets

(56) References Cited

U.S. PATENT DOCUMENTS

| | | |
|---|---|---|
| 2001/0029521 A1 | 10/2001 | Matsuda et al. |
| 2002/0026538 A1* | 2/2002 | Takeo et al. ............... 710/5 |
| 2002/0054105 A1* | 5/2002 | Breuer et al. ............ 345/764 |
| 2002/0163667 A1* | 11/2002 | Noda ...................... 358/1.15 |
| 2003/0218640 A1* | 11/2003 | Noble-Thomas ......... 345/853 |
| 2005/0105135 A1 | 5/2005 | Takahashi |
| 2005/0114767 A1 | 5/2005 | Sato |
| 2005/0243363 A1* | 11/2005 | Muto ....................... 358/1.15 |
| 2005/0256869 A1 | 11/2005 | Ikegami |
| 2006/0174189 A1* | 8/2006 | Weitzman et al. ......... 715/503 |
| 2006/0244998 A1* | 11/2006 | Salgado .................. 358/1.16 |
| 2007/0050697 A1* | 3/2007 | Lewis-Bowen et al. ..... 715/503 |
| 2007/0229896 A1* | 10/2007 | Fujimori et al. ........... 358/1.16 |
| 2009/0319543 A1* | 12/2009 | Danton et al. ............. 707/100 |
| 2010/0188700 A1* | 7/2010 | Fujimori et al. ........... 358/1.15 |

* cited by examiner

Job List

File  Edit  View  Favorites  Tools  Help

← Back  →  ⊗  ⇧  ⌂  ⎋  Search  ☐ Favorites  ◯ Media  ⏱  ⌂  ⎙  ▶  ☐

Address  http://xxxxxxxx  ▼ ⮞Go

LOG OUT

JOB LOG LIST

EDIT ▼ | JOB LOG ▼ | FILTER ▼ | DISPLAY ▼ | REARRANGE ▼

△▽ 1–14/14  TIME RANGE: 2005▼/8▼/5▼/0▼:0▼ ~ 2005▼/8▼/6▼/0▼:0▼ OK  ☐☐☐☐  1 /1PAGE

| | DATE AND TIME | JOB TYPE | USER NAME | MACHINE NO. | SOURCE TYPE | NO DETAILED DISPLAY | TARGET TYPE |
|---|---|---|---|---|---|---|---|
| ☐ | 2005/08/05 16:57:52 | P | testuser2 | RB273-365 | PDL | ✓ NO DETAILED DISPLAY | S/PO |
| ☐ | 2005/08/05 16:57:42 | CS | testuser | RB273-365 | READ | SOURCE (READ) | PO |
| ☐ | 2005/08/05 16:57:42 | CS | guest | RB273-365 | READ | SOURCE (STORAGE) | PO |
| ☐ | 2005/08/05 16:57:31 | SD | testuser2 | RB273-365 | READ | SOURCE (LINE/LAN) | PO |
| ☐ | 2005/08/05 16:57:21 | SD | testuser2 | RB273-365 | PDL | SOURCE (PDL) | S/PO |
| ☐ | 2005/08/05 16:57:09 | P | testuser2 | RB273-365 | PDL | SOURCE (INTERNAL) | S/PO |
| ☐ | 2005/08/05 16:57:09 | P | guest | RB273-365 | READ | | LL |
| ☐ | 2005/08/05 16:57:00 | SD | guest | RB273-365 | READ | | LL |
| ☐ | 2005/08/05 16:57:00 | SD | testuser | RB273-365 | PDL | | LL |
| ☐ | 2005/08/05 16:56:50 | SD | testuser | RB273-365 | READ | | S/PO |
| ☐ | 2005/08/05 16:56:41 | CS | testuser2 | RB273-365 | READ | | S/PO |
| ☐ | 2005/08/05 16:56:30 | P | testuser2 | RB273-365 | PDL | | S/PO |
| ☐ | 2005/08/05 16:56:29 | P | testuser | RB273-365 | PDL | | S/PO |
| ☐ | 2005/08/05 16:56:09 | CS | testuser | RB273-365 | READ | | S/PO |

Job List

File  Edit  View  Favorites  Tools  Help

←Back  ▶  ⊗  ⌂  ⌕Search  ☐Favorites  ◯Media  ⏱

Address  http://xxxxxxxxxx  ▽  ℰGo

JOB LOG LIST  ☐☐☐☐ LOG OUT

EDIT ▶ JOB LOG ▶ FILTER ▶ DISPLAY ▶ REARRANGE ▶
△▽ 1–14/14 △▽ TIME RANGE: 2005▼/8▼/5▼/0▼:0▼ ~ 2005▼/8▼/6▼/0▼:0▼ OK  1 / 1PAGE

| DATE AND TIME | JOB TYPE | USER NAME | MACHINE NO. | SOURCE TYPE | SOURCE (READ) | ORIGINAL PAGES | ORIGINAL SIZE | COLOR MODE | ORIGINAL TYPE | TARGET TYPE | NO DETAILED DISPLAY |
|---|---|---|---|---|---|---|---|---|---|---|---|
| ☐ 2005/08/05 16:57:52 ☐ | P | testuser2 | RB273-365 | PDL | | | | | | S/PO | |
| ☐ 2005/08/05 16:57:42 ☐ | CS | testuser | RB273-365 | | READ | 9 | OTHER | FC | C | S/PO | |
| ☐ 2005/08/05 16:57:42 ☐ | CS | testuser | RB273-365 | | READ | 9 | OTHER | FC | C | S/PO | |
| ☐ 2005/08/05 16:57:31 ☐ | SD | guest | RB273-365 | | READ | 2 | OTHER | FC | C | LL | |
| ☐ 2005/08/05 16:57:21 ☐ | SD | testuser | RB273-365 | PDL | | 3 | | | | LL | |
| ☐ 2005/08/05 16:57:09 ☐ | P | testuser2 | RB273-365 | PDL | | | | | | S/PO | |
| ☐ 2005/08/05 16:57:09 ☐ | P | testuser2 | RB273-365 | | READ | 2 | OTHER | FC | C | S/PO | |
| ☐ 2005/08/05 16:57:00 ☐ | SD | guest | RB273-365 | | READ | 2 | OTHER | FC | C | LL | |
| ☐ 2005/08/05 16:57:00 ☐ | SD | guest | RB273-365 | | READ | 3 | OTHER | FC | C | LL | |
| ☐ 2005/08/05 16:56:50 ☐ | SD | testuser | RB273-365 | PDL | | | | | | S/PO | |
| ☐ 2005/08/05 16:56:41 ☐ | CS | testuser | RB273-365 | PDL | | | | | | S/PO | |
| ☐ 2005/08/05 16:56:30 ☐ | P | testuser2 | RB273-365 | PDL | | | | | | S/PO | |
| ☐ 2005/08/05 16:56:29 ☐ | P | testuser2 | RB273-365 | | READ | 9 | OTHER | FC | C | S/PO | |
| ☐ 2005/08/05 16:56:09 ☐ | CS | testuser | RB273-365 | | | | | | | | |

| DATE AND TIME | JOB TYPE | USER NAME | MACHINE NO. | SOURCE TYPE | SOURCE (PDL) | CREATED PAGES | DOCUMENT NAME | LOGIN NAME | COMPUTER NAME | TARGET TYPE |
|---|---|---|---|---|---|---|---|---|---|---|
| 2005/08/05 16:57:52 | P | testuser2 | RB273-365 | PDL | | 23 | test.txt | PC-USER | PC-NAME | S/PO |
| 2005/08/05 16:57:42 | CS | testuser | RB273-365 | READ | | | | | | S/PO |
| 2005/08/05 16:57:42 | CS | testuser | RB273-365 | READ | | | | | | LL |
| 2005/08/05 16:57:31 | SD | guest | RB273-365 | READ | | | | | | LL |
| 2005/08/05 16:57:21 | SD | testuser | RB273-365 | PDL | | 23 | test.txt | PC-USER | PC-NAME | S/PO |
| 2005/08/05 16:57:09 | P | testuser2 | RB273-365 | PDL | | 23 | test.txt | PC-USER | PC-NAME | S/PO |
| 2005/08/05 16:57:09 | SD | guest | RB273-365 | READ | | | | | | LL |
| 2005/08/05 16:57:00 | SD | guest | RB273-365 | READ | | | | | | LL |
| 2005/08/05 16:57:00 | SD | testuser | RB273-365 | PDL | | 23 | test.txt | PC-USER | PC-NAME | S/PO |
| 2005/08/05 16:56:50 | CS | testuser | RB273-365 | READ | | | | | | LL |
| 2005/08/05 16:56:41 | P | testuser2 | RB273-365 | PDL | | 23 | test.txt | PC-USER | PC-NAME | S/PO |
| 2005/08/05 16:56:30 | P | testuser2 | RB273-365 | PDL | | 23 | test.txt | PC-USER | PC-NAME | S/PO |
| 2005/08/05 16:56:29 | P | testuser | RB273-365 | PDL | | 23 | test.txt | PC-USER | PC-NAME | S/PO |
| 2005/08/05 16:56:09 | CS | testuser | RB273-365 | READ | | | | | | S/PO |

| DATE AND TIME | JOB TYPE | USER NAME | MACHINE NO. | SOURCE TYPE | NO DETAILED DISPLAY | TARGET TYPE | TARGET (LINE/LAN) | DESTINATION | TRANS. TYPE / LINE TYPE | TRANS. PAGES |
|---|---|---|---|---|---|---|---|---|---|---|
| 2005/08/05 16:57:52 | P | testuser2 | RB273-365 | PDL | | STORAGE | | | | |
| 2005/08/05 16:57:42 | CS | testuser | RB273-365 | READ | | PAPER OUTPUT | | | | |
| 2005/08/05 16:57:42 | CS | testuser | RB273-365 | READ | | STORAGE | | | | |
| 2005/08/05 16:57:31 | SD | guest | RB273-365 | READ | | PAPER OUTPUT | | | | |
| 2005/08/05 16:57:21 | SD | testuser | RB273-365 | READ | | STORAGE | | | | |
| 2005/08/05 16:57:09 | P | testuser2 | RB273-365 | PDL | | LINE/LAN | | taroh@xxxxx.co.jp | MAIL | 5 |
| 2005/08/05 16:57:09 | P | testuser2 | RB273-365 | PDL | | LINE/LAN | | taroh@xxxxx.co.jp | MAIL | 5 |
| 2005/08/05 16:57:00 | SD | guest | RB273-365 | READ | | LINE/LAN | | 03-3479-6511 | G4-1 | 3 |
| 2005/08/05 16:57:00 | SD | guest | RB273-365 | READ | | LINE/LAN | | 044-239-1234 | G4-1 | 3 |
| 2005/08/05 16:56:50 | SD | testuser | RB273-365 | READ | | LINE/LAN | | 03-5421-2657 | G4-1 | 3 |
| 2005/08/05 16:56:41 | CS | testuser | RB273-365 | READ | | STORAGE | | | | |
| 2005/08/05 16:56:30 | P | testuser2 | RB273-365 | PDL | | PAPER OUTPUT | | | | |
| | | | | | | STORAGE | | | | |
| | | | | | | LINE/LAN | | taroh@xxxxx.co.jp | MAIL | 5 |
| | | | | | | LINE/LAN | | taroh@xxxxx.co.jp | MAIL | 5 |
| | | | | | | LINE/LAN | | 03-3479-6511 | G4-1 | 3 |
| | | | | | | LINE/LAN | | 044-239-1234 | G4-1 | 3 |
| | | | | | | LINE/LAN | | 03-5421-2657 | G4-1 | 3 |

FIG.15A

Job Log List Display Setting

File  Edit  View  Favorites  Tools  Help

⇐Back  ▶  ⇨  ▶  ⊗  🔍 Search  ☐ Favorites  ◯ Media

Address  http://xxxxxxxxxx ▽  &Go

213

SETTING > INDIVIDUAL CUSTOMIZING > JOB LOG LIST DISPLAY SETTING

JOB LOG LIST DISPLAY SETTING
DISPLAY ITEMS AND NUMBER OF LOGS TO BE DISPLAYED PER PAGE OF JOB LOG LIST CAN BE SET.

☐ NUMBER OF ITEMS TO BE DISPLAYED: [20] /PAGE

☐ NUMBER OF CHARACTERS TO BE DISPLAYED: ◯ OMIT  ⦿ NOT OMIT  [20]TH CHARACTER SEQ.

<BASIC ATTRIBUTE DISPLAY ITEMS>

☐ITEM LIST: 2131a

| START DATE AND TIME |
| END DATE AND TIME |
| OPERATIONS SOURCE |
| USER CODE/USER NAME TYPE |
| REPORT ISSUER ID |
| LOG NUMBER |
| ENTRY ID |
| HOST ADDRESS |
| HOST ADDRESS TYPE |
| BIND ID |
| LOG ID |

▲UP ▼DOWN

ADD ▷ 2131c

◁CANCEL 2131d

☐DISPLAY ITEMS: 2131b

| OCCURRENCE DATE AND TIME |
| DETAILED JOB TYPE |
| USER DISPLAY NAME |
| MACHINE SERIAL NUMBER |

▲UP ▼DOWN

<SOURCE (READ) DISPLAY ITEMS>

☐ITEM LIST: 2132a

| RESULTS |
| START DATE AND TIME |
| END DATE AND TIME |
| ORIGINAL SIZE (SUB SCANNING) |
| ORIGINAL SIZE (MAIN SCANNING) |
| READING RESOLUTION (SUB SCANNING) |
| READING RESOLUTION (MAIN SCANNING) |

ADD ▷ 2132c

◁CANCEL 2132d

☐DISPLAY ITEMS: 2132b

| NUMBER OF PAGES OF ORIGINAL |
| ORIGINAL SIZE |
| COLOR MODE |
| ORIGINAL TYPE |

▲UP ▼DOWN

CONTROLLER, METHOD, AND PROGRAM PRODUCT FOR CONTROLLING JOB INFORMATION DISPLAY, AND RECORDING MEDIUM

BACKGROUND OF THE INVENTION

1. Field of the Invention

The present invention relates generally to controllers, methods, and program products for controlling job information display, and recording media; and more particularly to a controller, method, and program product for controlling display of the list information of jobs executed in an apparatus on a display, and a recording medium on which a program for causing a computer to execute such a method is recorded.

2. Description of the Related Art

In recent years and presently, network apparatuses also have the same information processing capability as computers, and their functions are realized by various programs. For example, multifunction machines, which realize the functions of a copier, printer, scanner, and facsimile machine with a single housing, have application programs corresponding to the functions.

In general, programs that operate on computers output log information for analyzing bugs or understanding usage in order to perform billing. This is also the case with the network apparatus. That is, the log information related to jobs occurring in the network apparatus is also dumped therefrom.

As the number of items of the log information to be extracted increases, a more detailed analysis can be made. However, there is a problem in that this results in an enormous amount of information, thus making it difficult to easily understand the contents of the jobs.

In particular, when the log information is stored separately in multiple files (log files) or databases, it is difficult to accurately understand its contents by simply printing out the contents of each file or database or displaying the same with a text editor.

SUMMARY OF THE INVENTION

Embodiments of the present invention may solve or reduce the above-described problem.

According to one embodiment of the present invention, there are provided a controller, method, and program product for controlling job information display in which the above-described problem is solved.

According to one embodiment of the present invention, there are provided a controller, method, and program product for controlling job information display that make it possible to display the job information of an apparatus with ease; and a recording medium on which a program for causing a computer to execute such a method is recorded.

According to one embodiment of the present invention, there is provided a controller for controlling a display of list information of one or more jobs executed in one or more apparatuses on a display unit, wherein: with respect to a specified one of display items of the list information of the jobs, the display items each having one or more classifications and having one or more attribute items determined independently for each of the classifications, a selection field for selecting one of the classifications is displayed; and an area of the specified one of the display items is expanded in accordance with the one of the classifications selected in the selection field, and the attribute items corresponding to the selected one of the classifications are displayed in the expanded area with respect to one or more of the jobs related to the selected one of the classifications.

According to this invention, it is possible to display the job information of an apparatus in an easily understandable manner.

According to one embodiment of the present invention, there is provided a method for controlling a display of list information of one or more jobs executed in one or more apparatuses on a display unit, wherein: with respect to a specified one of display items of the list information of the jobs, the display items each having one or more classifications and having one or more attribute items determined independently for each of the classifications, a selection field for selecting one of the classifications is displayed; and an area of the specified one of the display items is expanded in accordance with the one of the classifications selected in the selection field, and the attribute items corresponding to the selected one of the classifications are displayed in the expanded area with respect to one or more of the jobs related to the selected one of the classifications.

According to one embodiment of the present invention, there is provided a program product for causing a computer to execute the above-described method.

According to one embodiment of the present invention, there is provided a computer-readable recording medium on which a program for causing a computer to execute such a method is recorded.

Thus, according to embodiments of the present invention, it is possible to provide a job information display controller, a job information display control method, and a job information display control program product that can display the job information of an apparatus in an easily understandable manner, and a recording medium on which such a program for causing a computer to execute such a job information display control method is recorded.

BRIEF DESCRIPTION OF THE DRAWINGS

Other objects, features and advantages of the present invention will become more apparent from the following detailed description when read in conjunction with the accompanying drawings, in which:

FIG. 5 is a diagram showing a display of a job list page in an initial condition according to the embodiment of the present invention;

FIG. 6 is a diagram showing a display of a drop-down list for selecting a source type for which one or more attribute items are to be displayed according to the embodiment of the present invention;

FIG. 7 is a diagram showing a display of the job list page in the case where a source type (READ) is selected according to the embodiment of the present invention;

FIG. 8 is a diagram showing a display of the job list page in the case where a source type (PDL) is selected according to the embodiment of the present invention;

FIG. 10 is a diagram showing a display of the job list page in the case where a target type (PAPER OUTPUT) is selected according to the embodiment of the present invention;

FIG. 11 is a diagram showing a display of the job list page in the case where a target type (LINE/LAN) is selected according to the embodiment of the present invention;

FIGS. 15A through 15C are diagrams showing a display of a display item setting page according to the embodiment of the present invention;

DETAILED DESCRIPTION OF THE PREFERRED EMBODIMENTS

A description is given, with reference to the accompanying drawings, of an embodiment of the present invention.

Figure 1:
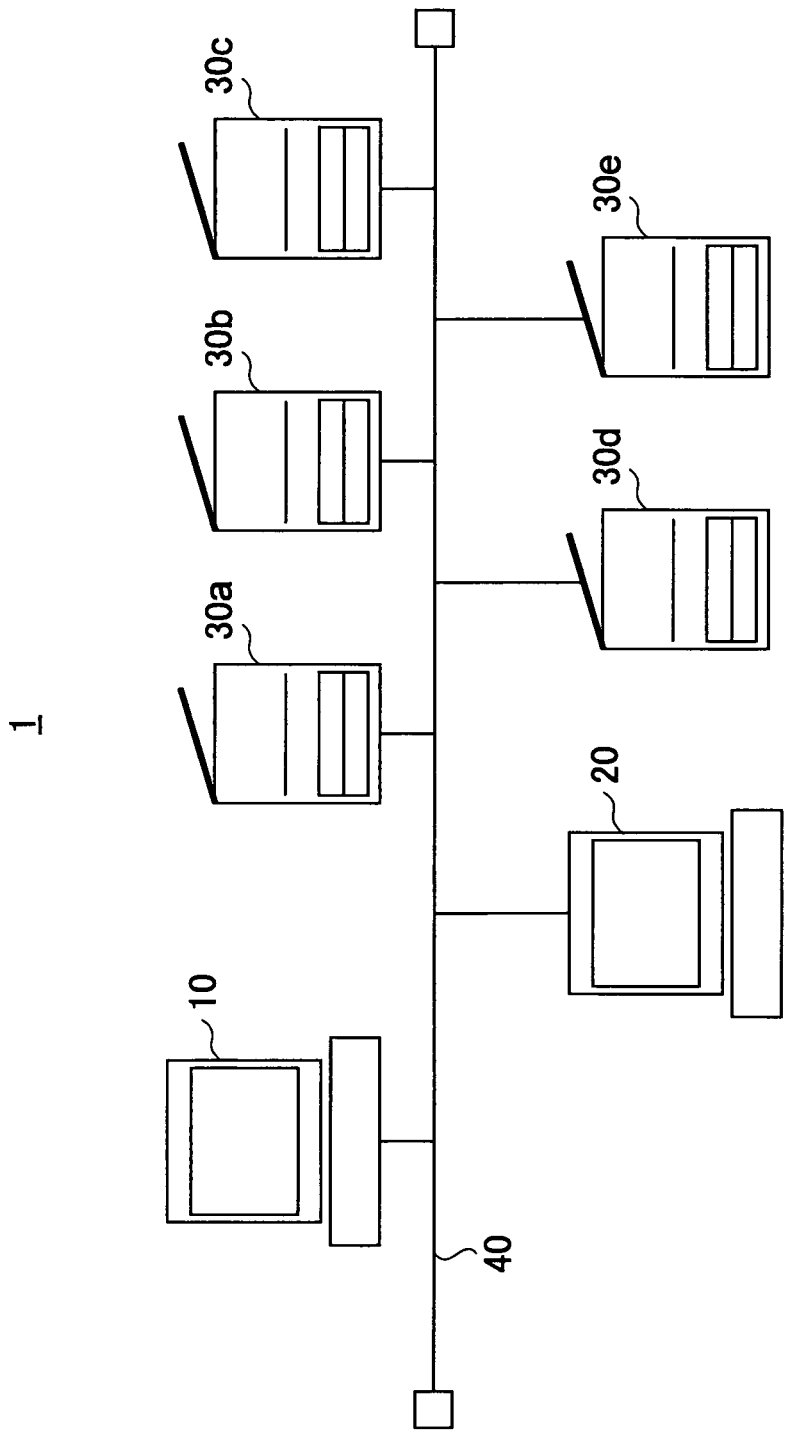
FIG. 1 is a diagram showing a log management system according to an embodiment of the present invention.

FIG. 1 is a diagram showing a log management system 1 according to the embodiment of the present invention.

Referring to FIG. 1, the log management system 1 includes a log management server 10, a client PC 20, and multifunction machines 30a through 30e (hereinafter also "multifunction machine 30" if referred to collectively) that are connected through a network 40 (either wired or wireless) such as a LAN (local area network), an intranet, or the Internet.

The log management server 10 is a computer that stores and manages log information collected from the multifunction machine 30, and controls display of the log information. Here, the log information refers to log information related to various jobs such as copying and printing in the multifunction machine 30. The log information may be collected by, for example, the log management server 10 periodically downloading the log information from the multifunction machine 30 or the multifunction machine 30 uploading the log information at any time or periodically to the log management server 10.

The client PC 20 is an apparatus used as a terminal for viewing the log information managed by the log management server 10. Accordingly, the client PC 20 may be replaced by a PDA (Personal Digital Assistant) or a cellular phone.

The multifunction machine 30 is an example apparatus, and is an image forming apparatus that realizes functions such as copying, printing, scanning, and facsimile transmission and reception functions with a single housing. The multifunction machine 30 has the function of extracting the log information of jobs related to the various functions. The extracted log information is stored in the log management server 10 as described above.

Figure 2:
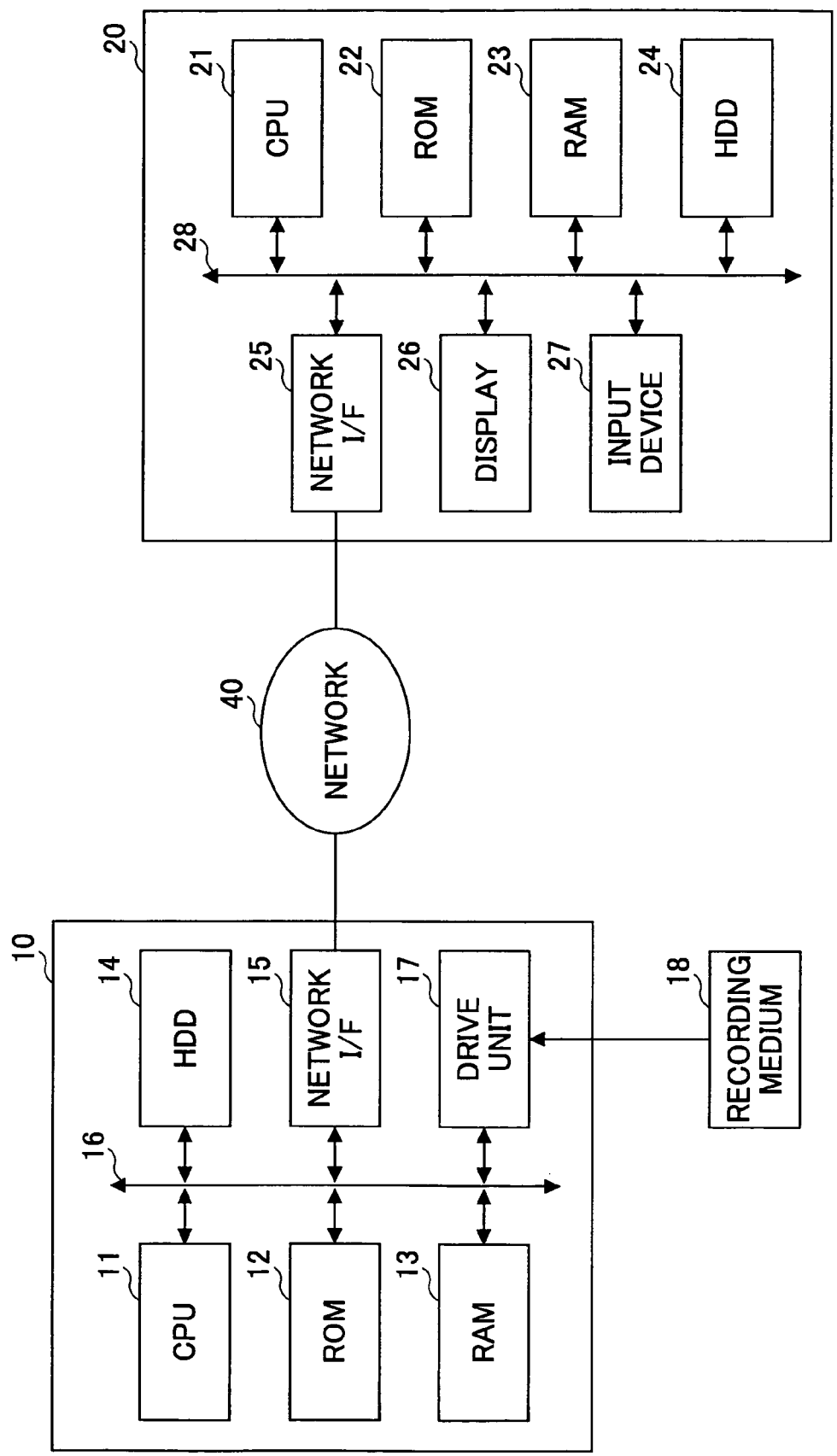
FIG. 2 is a diagram showing a hardware configuration of a log management server and a hardware configuration of a client PC according to the embodiment of the present invention.

FIG. 2 is a diagram showing a hardware configuration of the log management server 10 and a hardware configuration of the client PC 20 according to this embodiment.

As shown in FIG. 2, the hardware configuration of the log management server 10 may be realized using a known computer. That is, the log management server 10 includes a CPU 11, a ROM 12, a RAM 13, a hard disk drive (HDD) 14, a network interface (I/F) 15, and a drive unit 17, which are connected through a system bus 16.

The CPU 11 is a control part that controls the entire log management server 10. The CPU 11 performs the operations of controlling the server 10, controlling communications, obtaining and editing data, etc., by executing various control programs and application programs stored in the ROM 12 and the HDD 14. The functions according to the embodiment of the present invention are also realized by the CPU 11 executing one or more programs.

The ROM 12 is a storage part that principally stores the control program of the server 10. The RAM 13 is a storage part used as a work memory for the CPU 11 or used for temporary data storage.

The HDD 14 is a storage part that stores various application programs and data. The log information collected from the multifunction machine 30 is also stored in the HDD 14.

The network I/F 15 is an interface for connecting the log management server 10 to the network 40.

The drive unit 17 is a device for reading a recording medium 18 such as a CD-ROM on which a program for executing one or more functions of the embodiment of the present invention is recorded.

In FIG. 2, an operations part (input device) and a display part (display) are not shown in the log management server 10. Input devices such as a keyboard and a mouse, and a display such as a liquid crystal display or a cathode-ray tube (CRT) display may be provided so as to receive user's input and display operations results.

On the other hand, the hardware configuration of the client PC 20 may also be realized using a known computer. That is, the client PC 20 includes a CPU 21, a ROM 22, a RAM 23, an HDD 24, a network I/F 25, a display 26, and an input device 27, which are connected through a system bus 28. The CPU 21, the ROM 22, the RAM 23, the HDD 24, and the network I/F 25 have the same functions as those of the log management server 10.

Figure 3:
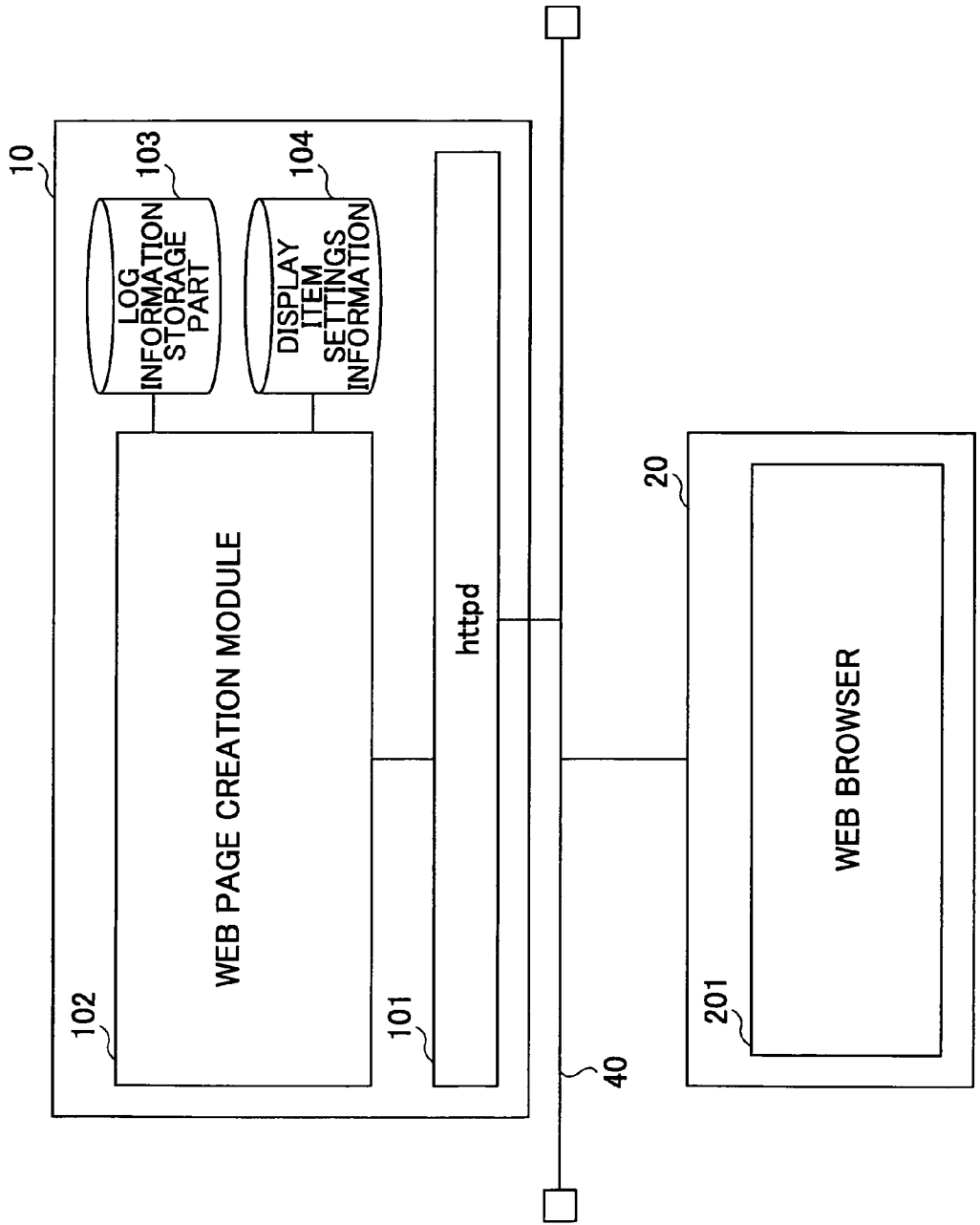
FIG. 3 is a diagram showing a functional configuration of the log management server and a functional configuration of the client PC according to the embodiment of the present invention.

FIG. 3 is a diagram showing a functional configuration of the log management server 10 and a functional configuration of the client PC 20 according to the embodiment of the present invention.

Referring to FIG. 3, the log management server 10 includes an httpd (HyperText Transfer Protocol Daemon) 101, a Web page creation module 102, a log information storage part 103, and display item settings information 104.

The httpd 101 is a daemon process that causes the log management server 10 to function as a Web server. That is, the httpd 101 receives an HTTP (HyperText Transfer Protocol) request, and returns an HTTP response corresponding to the HTTP request.

The Web page creation module 102 responds to a call from the httpd 101, and creates information requested in the HTTP request as a Web page. In this embodiment, the Web page creation module 102 creates, for example, a Web page on which the log information (list information) of jobs is displayed. Hereinafter, such a Web page is referred to as "job list page."

The log information storage part 103 stores log information collected from the multifunction machine 30. The display item settings information is information for specifying log information items to be displayed on the job list page. That is, on the job list page, not all the items of the log information are displayed, but the items selected beforehand by a user are displayed as display items.

On the other hand, the client PC 20 includes a Web browser 201 for displaying the job list page. The Web browser 201 may be a common Web browser.

Figure 4:
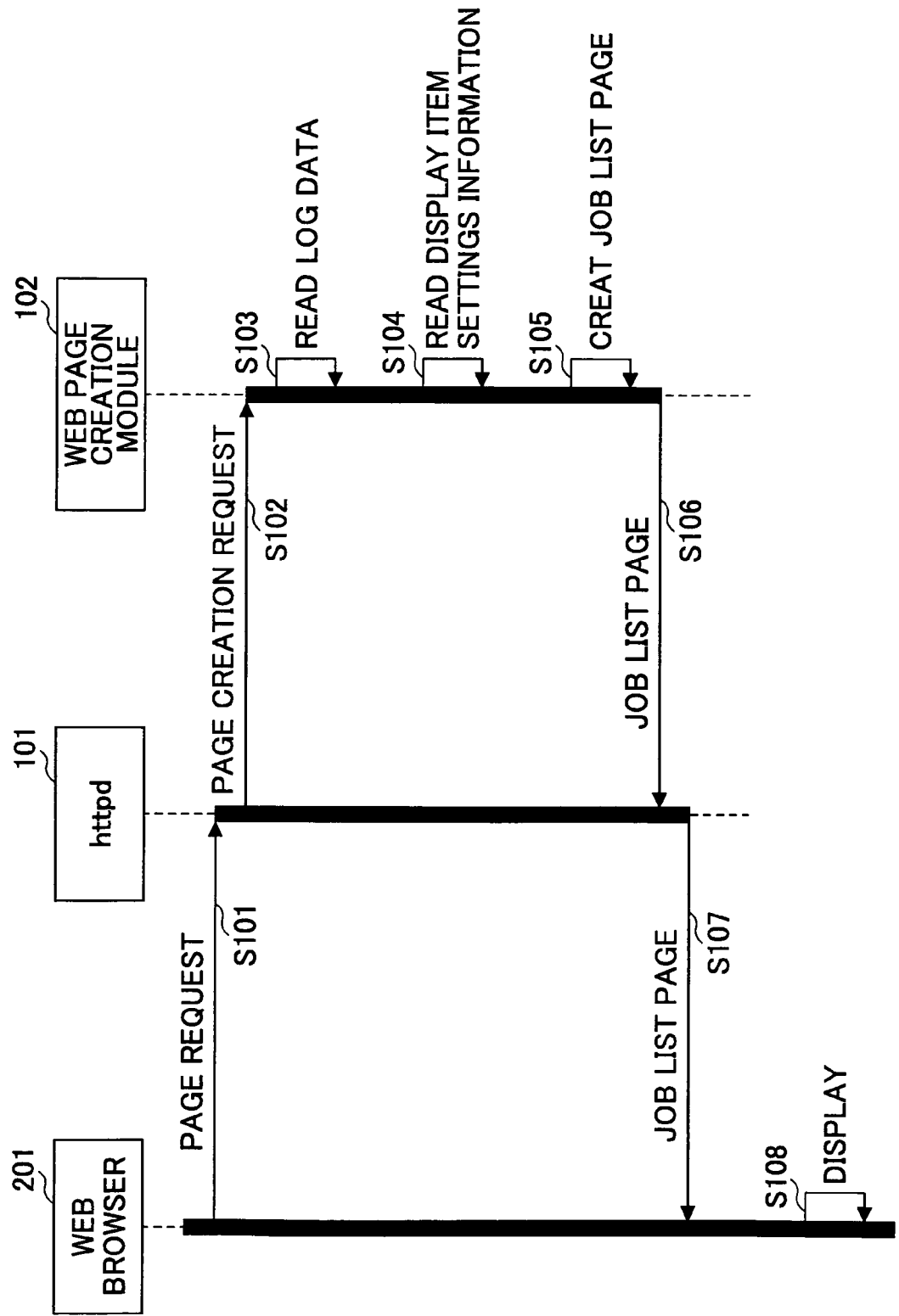
FIG. 4 is a sequence diagram for illustrating a basic procedure of the log management system according to the embodiment of the present invention.

Next, a description is given of a procedure of the log management system 1 according to this embodiment. FIG. 4 is a sequence diagram for illustrating a basic procedure of the log management system 1.

For example, when a user gives an instruction to display a job list page through the home page of the log management server 10 displayed on the Web browser 201, in step S101, the Web browser 201 transmits an HTTP request for the job list page to the httpd 101.

In step S102, receiving the HTTP request, the httpd 101 requests the Web page creation module 102 to create the job list page. In step S103, the Web page creation module 102 reads log information from the log information storage part 103. Further, in step S104, the Web page creation module 102 reads the display item settings information 104, and in step S105, creates the job list page so that of the items of the log information, those set in the display item settings information 104 are displayed. In step S106, the created job list page is output to the httpd 101.

In step S107, the httpd 101 transmits an HTTP response including the job list page to the Web browser 201. Then, in step S108, the job list page is displayed by the Web browser 201.

Figure 5:
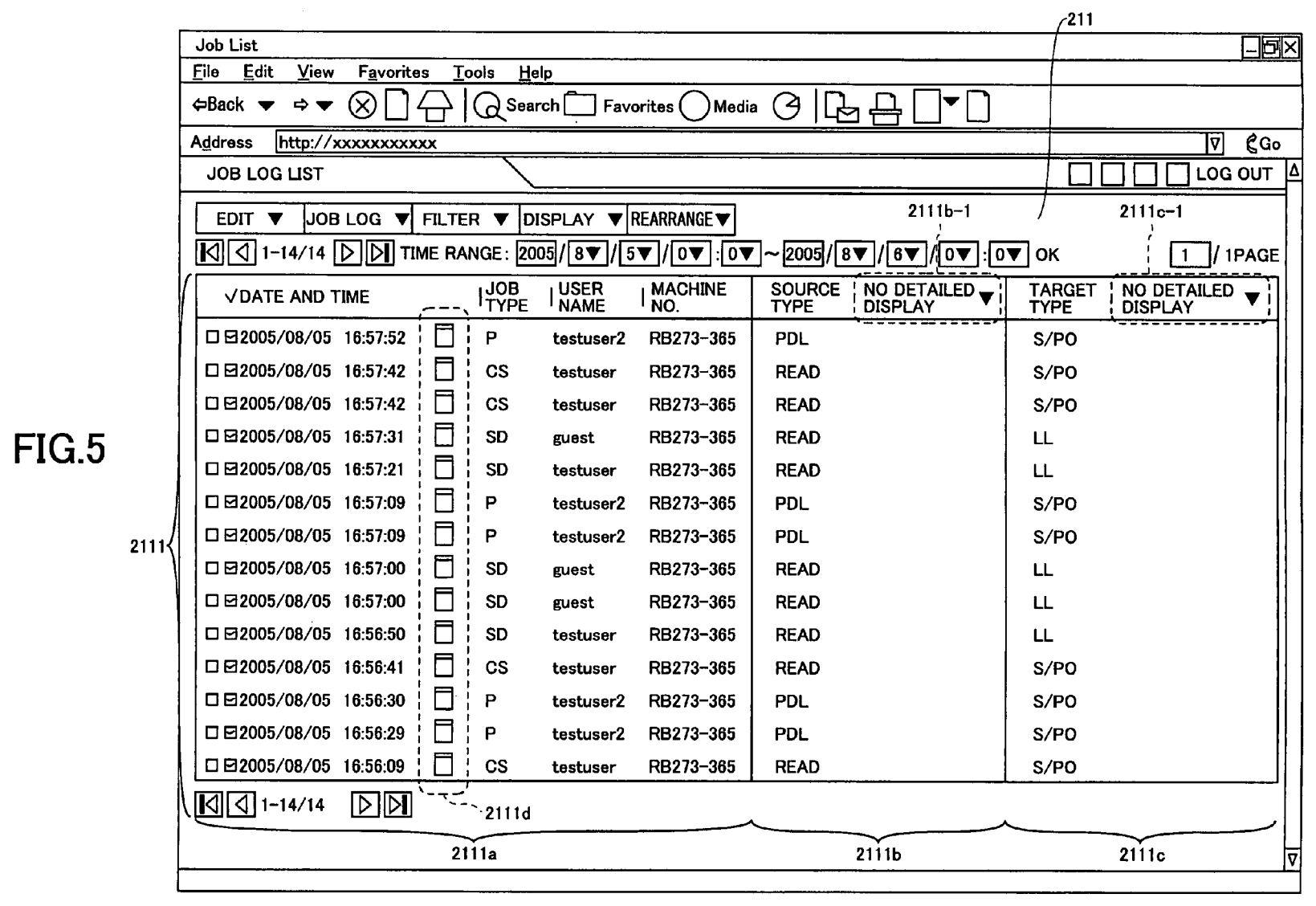

FIG. 5 is a diagram showing a display of the job list page in an initial condition. In a job list page 211 of FIG. 5, a job list 2111 is the log information of jobs. A basic attribute item 2111a, a source type item 2111b, and a target type item 2111c are displayed for each job. Here, one line is assigned to one job.

The basic attribute item 2111a is an item or a group of items common to all jobs. In FIG. 5, an occurrence date and time (date and time), a job type, a user display name (user name), and a serial machine number (machine no.) are displayed as the basic attribute item 2111a.

The date and time of occurrence is a date and time of occurrence of a job. The job type indicates the type of a job. Job types include printing, copy storage (storing a copy image in a hard disk simultaneously with copying), and scanner distribution (distributing a scanner-read image through a network), which are indicated in abbreviated form as P, CS, and SD, respectively, in FIG. 5 for convenience of graphical representation. The user display name is the name for display of a user who has given an instruction to execute the job. The serial machine number is the identification number of the multifunction machine 30 that has executed the job.

The source type item 2111b is an item in which the source type of a job is displayed. The source type refers to the type of the input source of information that is input with respect to the job. For example, source types include PDL (Page Description Language) that indicates printing data, READ that indicates a scanner-read image, LINE/LAN that indicates information received through a telephone line or a LAN, and STORAGE that indicates an image stored in a hard disk of the multifunction machine 30. In FIG. 5, the source type is displayed as PDL or READ. Alternatively, the source type may also be displayed as SOURCE (PDL) or SOURCE (READ).

The target type item 2111c is an item in which the target type of a job is displayed. The target type refers to the type of an output destination to which information is output by the job. For example, target types include STORAGE indicating storage in the multifunction machine 30, LINE/LAN that indicates transmission through the network, and PAPER OUTPUT that indicates output onto paper. In FIG. 5, PAPER OUTPUT, STORAGE, LINE/LAN are displayed in abbreviated form as PO, S, and LL, respectively, for convenience of graphical representation. Further, in FIG. 5, the target type is displayed as S/PO or LL. Alternatively, the target type may also be displayed as TARGET (STORAGE)/TARGET (PAPER OUTPUT) or TARGET (LINE/LAN).

Each of the source type and the target type is information that includes more detailed attribute items. However, the attribute items differ between the individual source types (classifications) and between the individual target types (classifications) Therefore, if the attribute items are displayed for each source type and each target type from the beginning, the source type item 2111b and the target type item 2111c become visually complicated and difficult to understand. Therefore, in the initial condition of the job list page 211, the detailed attribute items of the source type and the target type are not displayed, and only character strings for merely identifying their types are displayed.

If a user clicks on an area 2111b-1, the job list page 211 causes a drop-down list (menu) to be displayed as a selection field or space from which a source type for which one or more detailed attribute items are to be displayed is selected.

FIG. 6 is a diagram showing a display of the drop-down list for selecting a source type for which one or more attribute items are to be displayed.

Referring to FIG. 6, the name of a source type is displayed in each item of a drop-down list 2111b-2. When a user selects one of the type names, the same operation as the sequence shown in FIG. 4 is performed, and the job list page 211 is newly created, or updated, and is displayed on the Web browser 201. In this case, however, the HTTP request transmitted from the Web browser 201 to the httpd 101 in step S101 (FIG. 4) includes a command to display the attribute item(s) of the source type selected in the drop-down list 2111b-2. Accordingly, in step S105, the Web page creation module 102 creates the job list page 211 so that the attribute item(s) of the selected source type is/are displayed.

FIG. 7 is a diagram showing a display of the job list page in the case where the source type (READ) is selected.

In the job list 2111 of the job list page 211 of FIG. 7, the source type item 2111b is expanded, and with respect to the jobs related to the selected source type (READ) (for example, the second through fifth, eighth through $11^{th}$, and $14^{th}$ jobs), the values of the attribute items corresponding to or characteristic of READ (the number of pages of original material [Original Pages], the size of the original material [Original Size], a color mode (Color Mode), and the type of the original material [Original Type]) are displayed. On the other hand, with respect to the jobs that are not related to the selected source type, the fields of the attribute items corresponding to or characteristic of READ are blank. The resolutions in the main scanning direction and the sub scanning direction of the original material may also be displayed as attribute items corresponding to or characteristic of READ. In FIG. 7, for convenience of graphical representation, full color is abbreviated as FC in the attribute item of Color Mode, and color is abbreviated as C in the attribute item of Original Type.

FIG. 8 is a diagram showing a display of the job list page in the case where the source type (PDL) is selected.

In the job list 2111 of the job list page 211 of FIG. 8, the source type item 2111b is expanded, and with respect to the jobs related to the selected source type (PDL) (for example, the first, sixth, seventh, 12th, and 13th jobs), the values of the attribute items corresponding to or characteristic of PDL (the number of pages created [Created Pages], the name of a printed document [Document Name], a login name [Login Name], and a computer name [Computer Name]) are displayed. On the other hand, with respect to the jobs that are not related to the selected source type, the fields of the attribute items corresponding to or characteristic of PDL are blank. Information on a printing condition may also be displayed as an attribute item corresponding to or characteristic of PDL.

Further, although graphical representation is omitted for convenience reasons, in the case where STORAGE or LINE/LAN is selected, the attribute items corresponding thereto or characteristic thereof are displayed in the source type item 2111b. For example, if STORAGE is selected, the number of pages stored, the name of a stored document, etc., are displayed as attribute items. Further, if LINE/LAN is selected, the number of pages received, etc., is displayed.

In each of FIGS. 7 and 8, the basic attribute item 2111a and the target type item 2111c are not affected by the expansion of the source type item 2111b, and their display conditions remain the same as before.

Referring back to FIG. 5, if a user clicks on an area 2111c-1, the job list page 211 causes a drop-down list (menu) to be displayed as a selection field from which a target type for which one or more detailed attribute items are to be displayed is selected.

Figure 9:
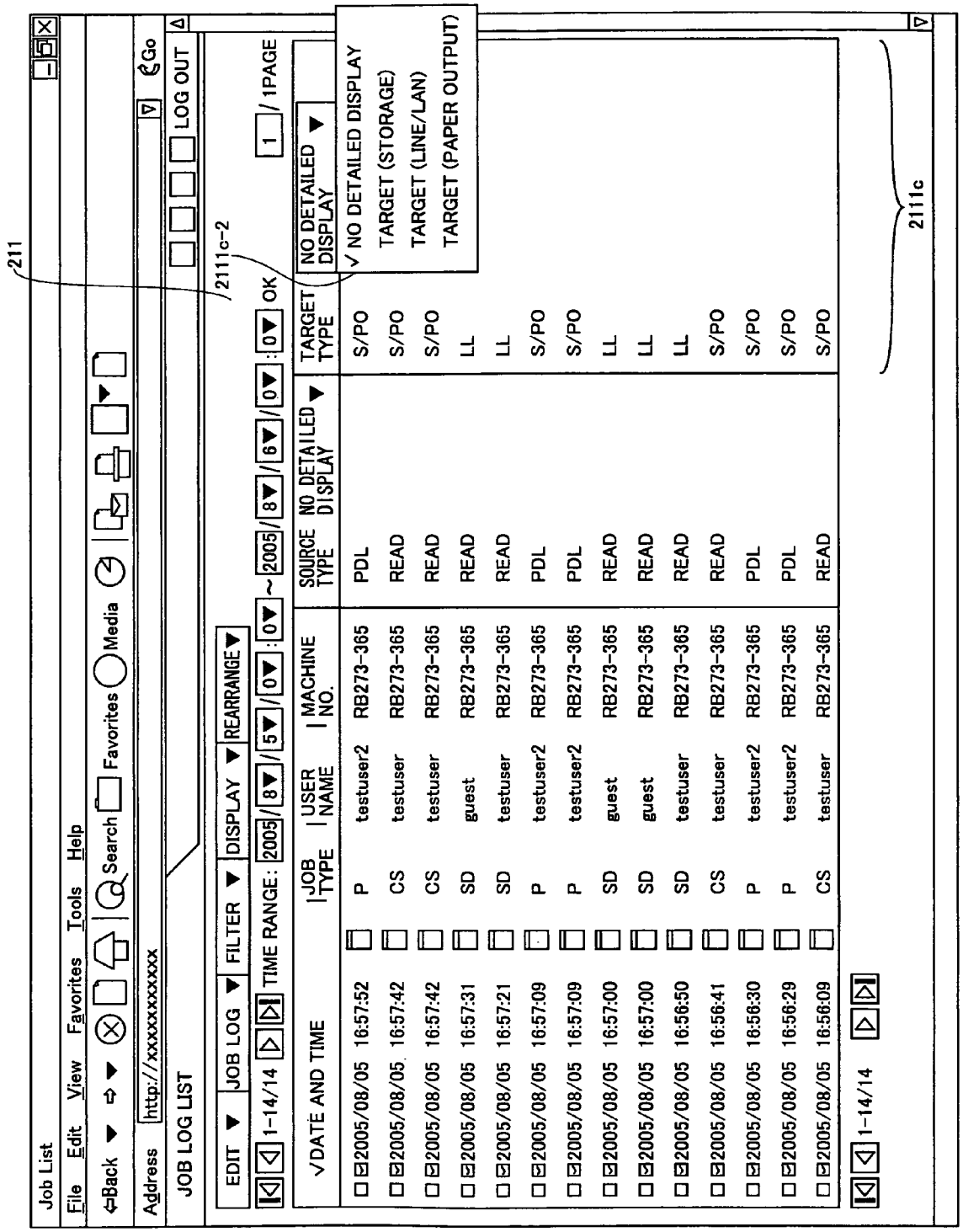
FIG. 9 is a diagram showing a display of a drop-down list for selecting a target type for which one or more attribute items are to be displayed according to the embodiment of the present invention.

FIG. 9 is a diagram showing a display of the drop-down list for selecting a target type for which one or more attribute items are to be displayed.

Referring to FIG. 9, the name of a target type is displayed in each item of a drop-down list 2111c-2. When a user selects one of the type names, the same operation as the sequence shown in FIG. 4 is performed, and the job list page 211 is newly created, or updated, and is displayed on the Web browser 201. In this case, however, the HTTP request transmitted from the Web browser 201 to the httpd 101 in step S101 (FIG. 4) includes a command to display the attribute item(s) of the target type selected in the drop-down list 2111c-2. Accordingly, in step S105, the Web page creation module 102 creates the job list page 211 so that the attribute item(s) of the selected target type is/are displayed.

Figure 10:
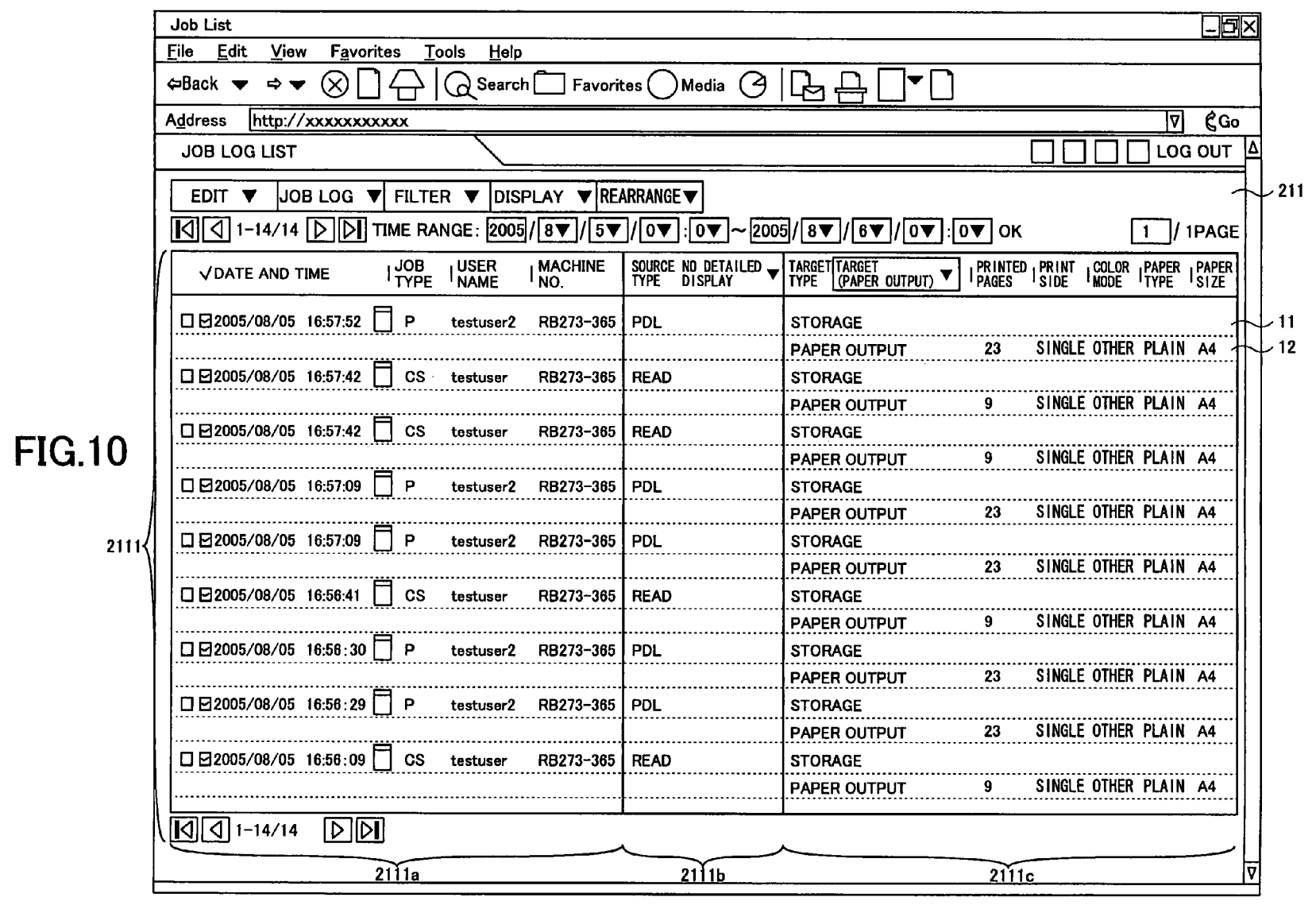

FIG. 10 is a diagram showing a display of the job list page in the case where the target type (PAPER OUTPUT) is selected.

In the job list 2111 of the job list page 211 of FIG. 10, the target type item 2111c is expanded, and with respect to the jobs related to the selected target type (PAPER OUTPUT) (all the displayed jobs in FIG. 10), the values of the attribute items corresponding to or characteristic of PAPER OUTPUT (the number of pages printed [Printed Pages], a print side [Print Side], a color mode (Color Mode), and paper size [Paper Size]) are displayed. In the display condition shown in FIG. 10, of the jobs displayed in the job list page 211 of FIG. 9, only the jobs related to the target type PAPER OUTPUT are extracted for convenience of graphical representation. In the source type item 2111c of FIG. 10, SINGLE in the attribute item PRINT SIDE indicates a single side (single-sided printing), and PLAIN in the attribute item PAPER TYPE indicates plain paper.

Some jobs include multiple target types (that is, output information to multiple destinations). For example, referring to FIG. 5, the target type of the first job is S/PO, that is, target (STORAGE)/target (PAPER OUTPUT). This indicates that the first job outputs an image as a paper document while storing the output image in the multifunction machine 30. With respect to such a job, if one of the target types included in the job is selected as a target type of which attribute item(s) is/are to be displayed, a line is assigned to each of the target types of the job. In the line related to the selected target type, the value(s) of the attribute item(s) of the selected target type is/are displayed, while the fields of the attribute item(s) of the other target type(s) are blank.

This can be visually recognized in FIG. 10. Referring to FIG. 10, the target type of the first job includes STORAGE and PAPER OUTPUT, which are assigned a line 11 and a line 12, respectively. Here, since the selected target type is PAPER OUTPUT, the values of the attribute items corresponding to PAPER OUTPUT are displayed in the line 12. Meanwhile, the fields of the attribute items are blank with respect to the line 11 related to STORAGE. The same is the case with the other jobs. Thus, even in the case where a job has multiple target types, the job list page 211 can provide information in an easily viewable form and manner. It is also possible to handle the case where a job includes multiple source types the same as in the above-described case of multiple target types.

FIG. 11 is a diagram showing a display of the job list page in the case where the target type (LINE/LAN) is selected.

In the job list 2111 of the job list page 211 of FIG. 11, the target type item 2111c is expanded, and with respect to the jobs related to the selected target type (LINE/LAN), the values of the attribute items corresponding to or characteristic of LINE/LAN (a destination [Destination], a transmission type [Trans. Type], a line type (Line Type), and the number of pages transmitted [Trans. Pages]) are displayed. With respect to the jobs that are not related to the selected target type, the fields of the attribute items corresponding to or characteristic of LINE/LAN are blank.

In the case of the target type LINE/LAN, some jobs include multiple values in the destination (that is, perform simultaneous transmission to multiple destinations). For example, in FIG. 11, the fourth job has performed transmission to multiple destinations. Such a job is displayed with each destination being assigned a line (for example, lines 13 and 14). Thus, even in the case where a predetermined attribute item has multiple values, the job list page 211 can provide information in an easily viewable form and manner.

Although graphical representation is omitted for convenience reasons, in the case where STORAGE is selected, the attribute items corresponding thereto or characteristic thereof are displayed in the target type item 2111c. For example, if STORAGE is selected, the number of pages stored and the name of a stored document, etc., are displayed as attribute items.

In each of FIGS. 10 and 11, the basic attribute item 2111a and the source type item 2111b are not affected by the expansion of the target type item 2111c, and their display conditions remain the same as before.

As described above, the job list 2111 of the job list page 211 does not necessarily display all items extracted as log information, but may display only the items set as display items in the display item settings information 104. However, in consideration of the case where a user wishes to check more detailed information while browsing, a detailed information display icon 2111d (FIG. 5) is provided for each job in the job list page 211.

That is, if a user clicks on the detailed information display icon 2111d of any job, the Web browser 201 transmits an HTTP request for a Web page that displays the detailed information of the job (hereinafter, referred to as "detailed page") to the httpd 101. When the httpd 101 requires the Web page creation module 102 to create the detailed page of the job, the Web page creation module 102 obtains the log information of the job from the log information storage part 103, and creates the detailed page. The created detailed page is transmitted to the Web browser 201 by the httpd 101, and is displayed by the Web browser 201.

Figure 12:
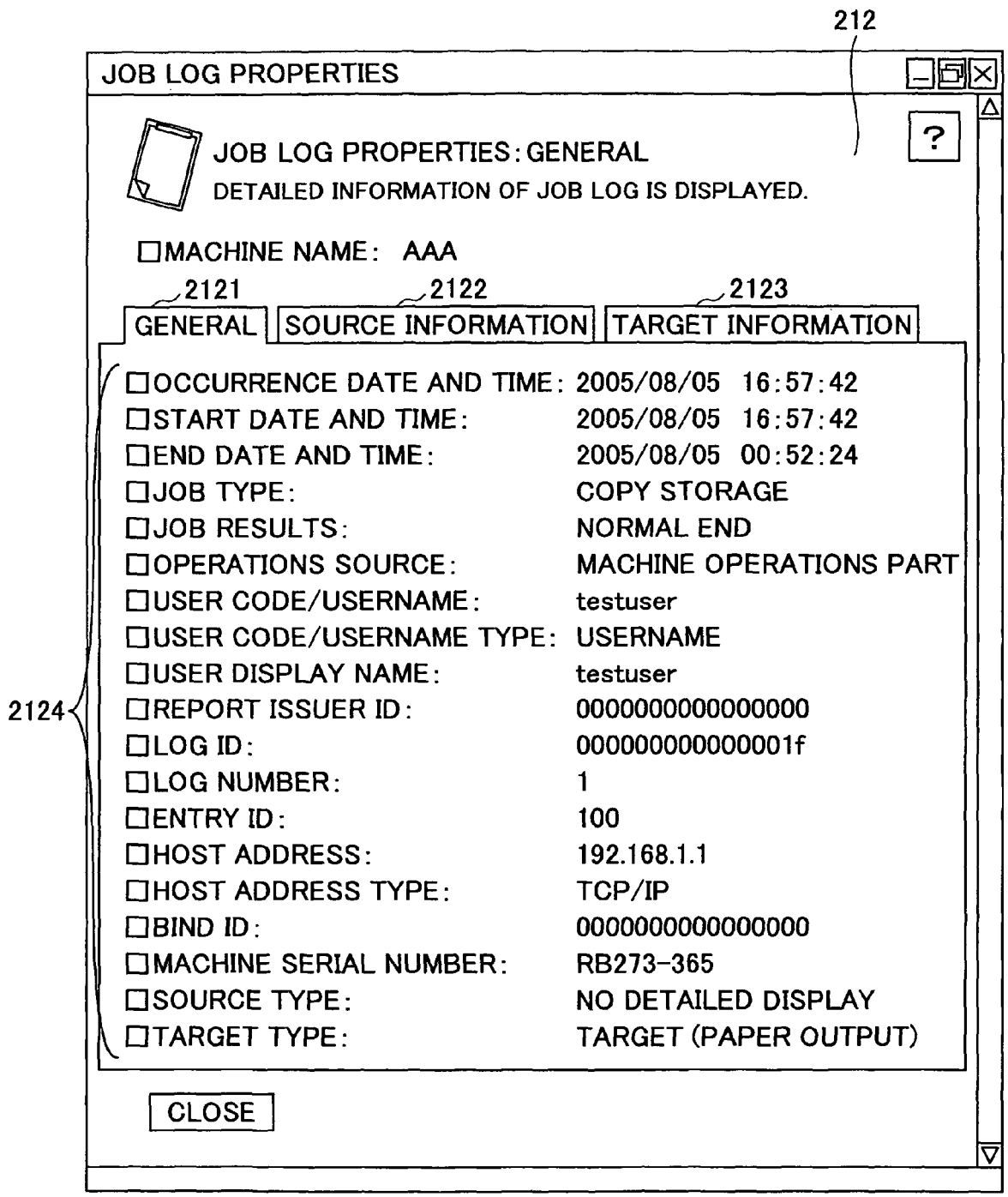
FIG. 12 is a diagram showing a display of basic attribute detailed information on a detailed page according to the embodiment of the present invention.

FIG. 12 is a diagram showing a display of basic attribute detailed information on the detailed page.

As shown in FIG. 12, a GENERAL tab 2121, a SOURCE INFORMATION tab 2122, and a TARGET INFORMATION tab 2123 are provided in a detailed page 212. In the initial condition, the GENERAL tab 2121 is selected. When the GENERAL tab 2121 is selected, the detailed information of basic attributes is displayed in an area 2124 on the detailed page 212.

Figure 13:
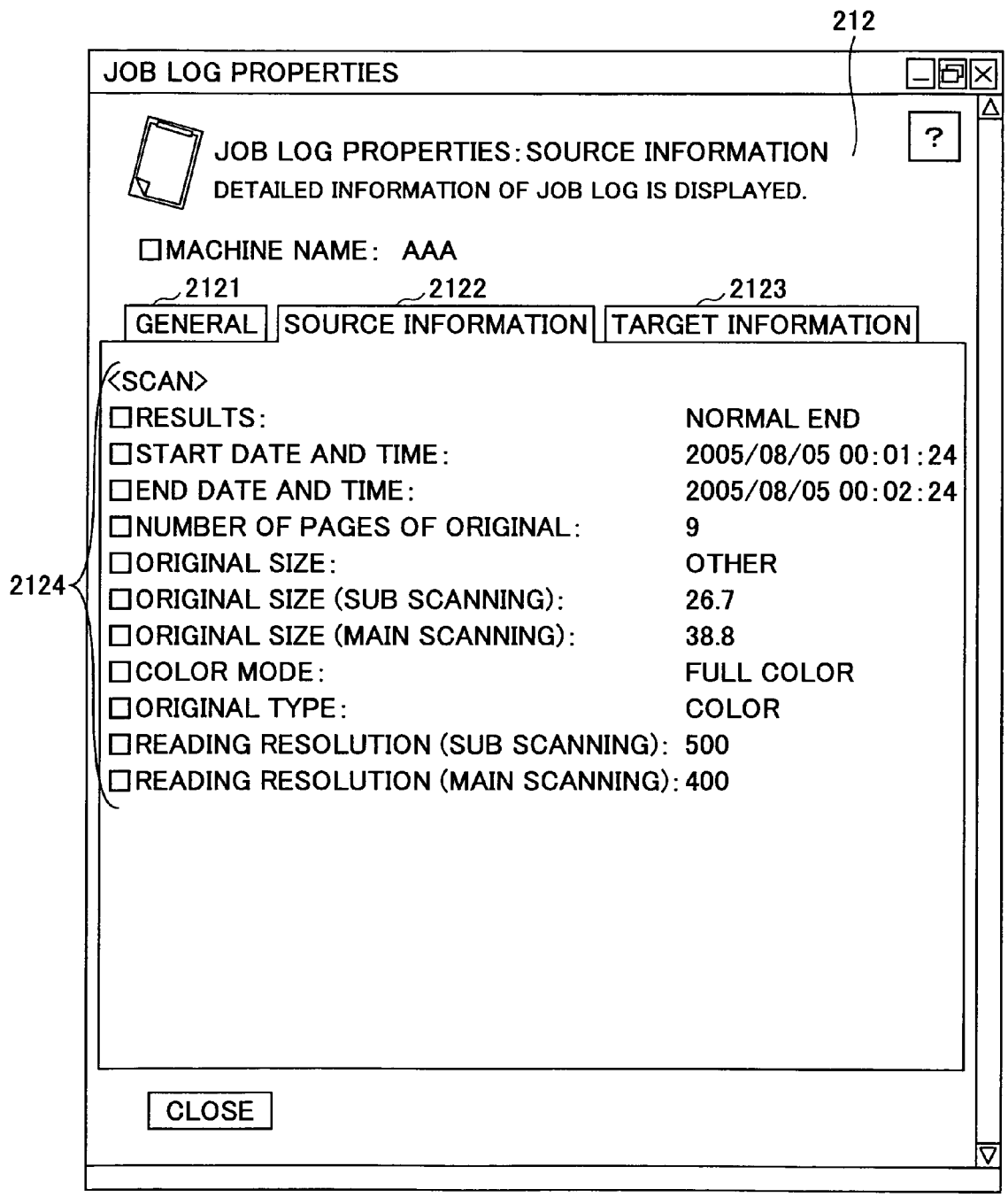
FIG. 13 is a diagram showing a display of source type-related detailed information on the detailed page according to the embodiment of the present invention.

Further, if the SOURCE INFORMATION tab 2122 is selected, source type-related detailed information is displayed on the detailed page 212. FIG. 13 is a diagram showing a display of source type-related detailed information on the detailed page 212.

In FIG. 13, the attribute items of a source type are displayed in detail in the area 2124.

Figure 14:
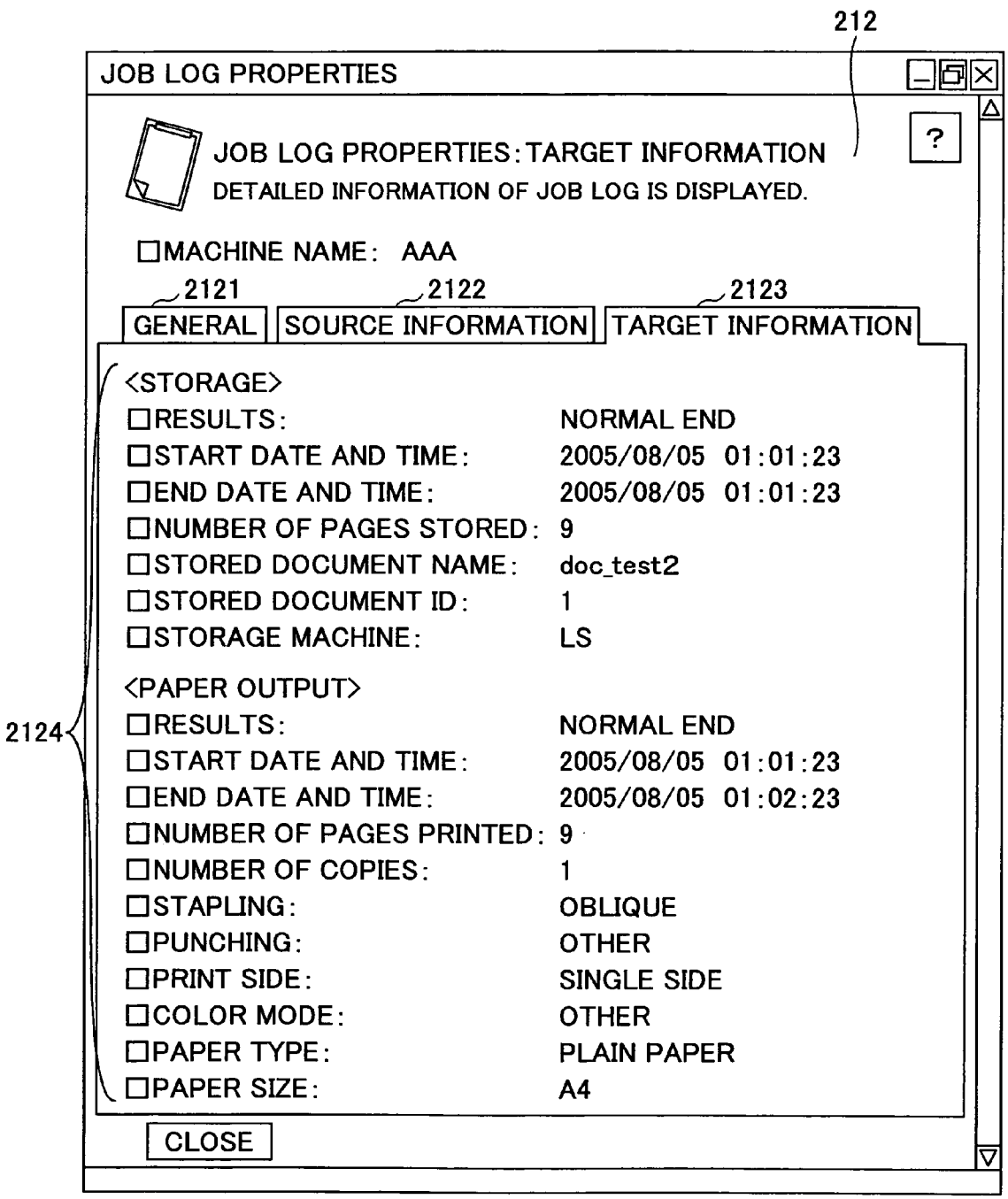
FIG. 14 is a diagram showing a display of target type-related detailed information on the detailed page according to the embodiment of the present invention.

Further, if the TARGET INFORMATION tab 2123 is selected, target type-related detailed information is displayed on the detailed page 212. FIG. 14 is a diagram showing a display of target type-related detailed information on the detailed page 212.

In FIG. 14, the attribute items of target types are displayed in detail in the area 2124.

Next, a description is given of setting one or more display items in the job list 2111 of the job list page 211. The display items can be set by causing a Web page for setting display items (hereinafter referred to as "display item setting page") created by the Web page creation module 102 of the log management server 10 to be displayed on the Web browser 201.

Figure 15B:
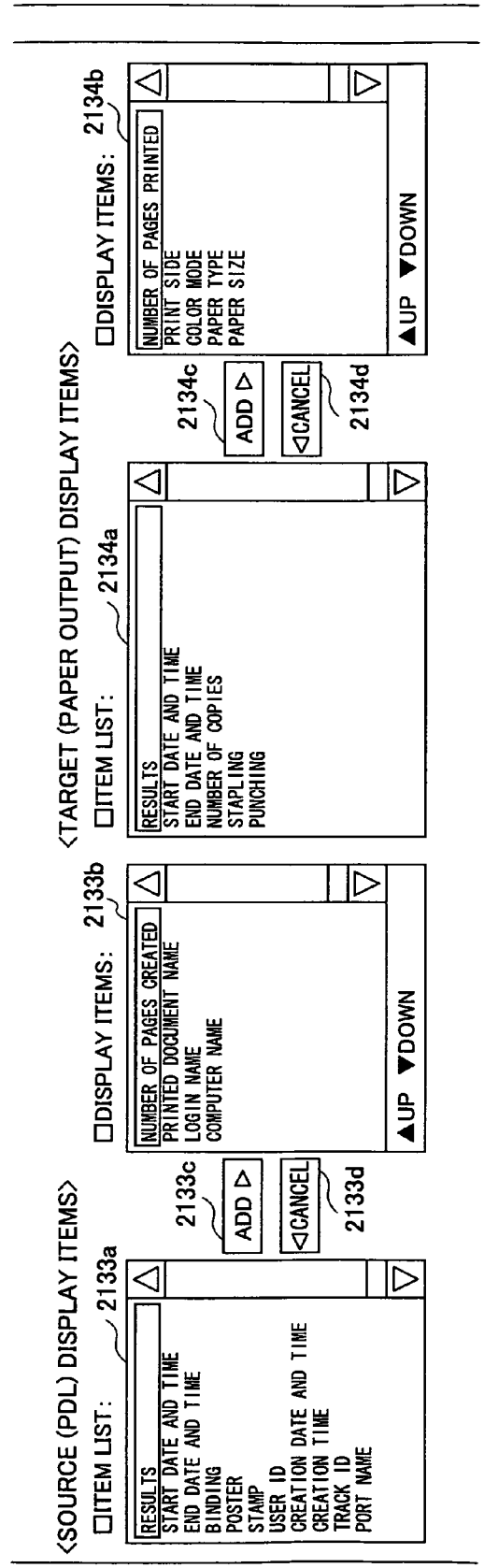
Figure 15C:
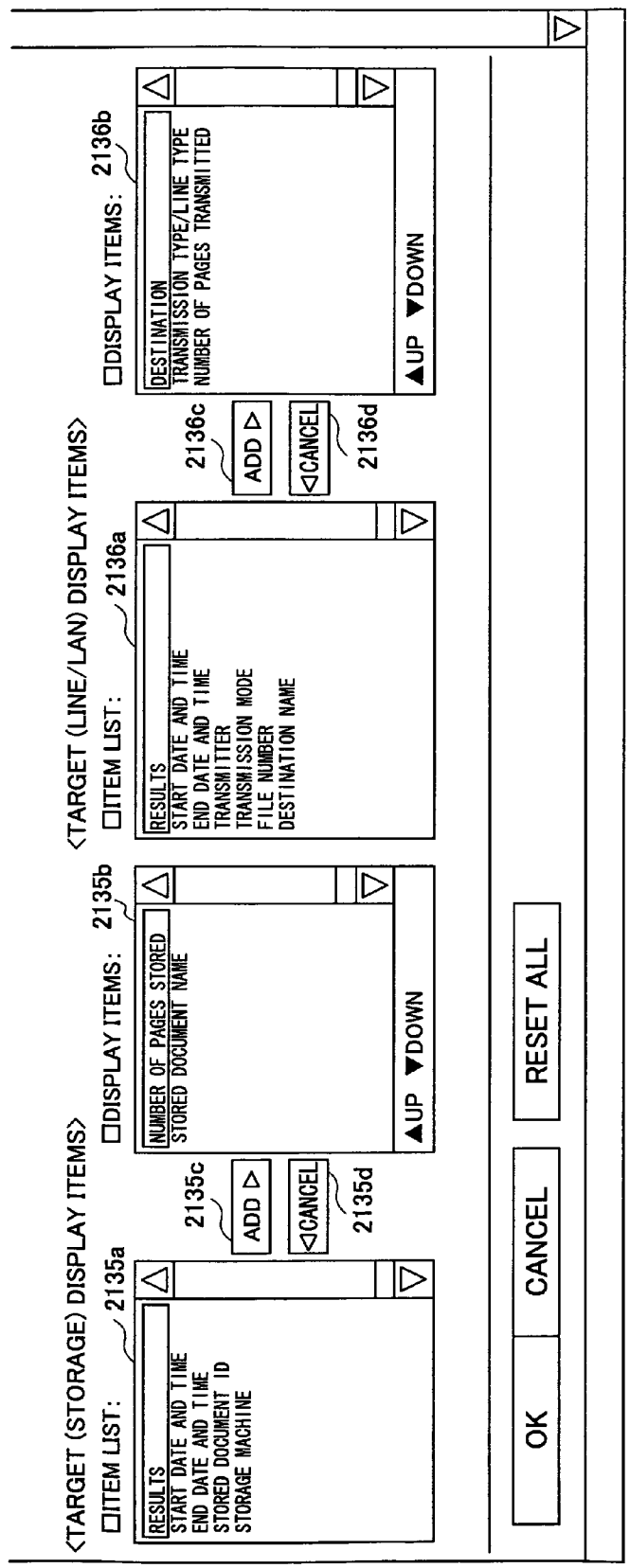

FIGS. 15A through 15C are diagrams showing a display of the display item setting page.

A display item setting page 213 of FIGS. 15A through 15C is configured so that display items are set or determined for each of the basic attribute, the source type, and the target type. For convenience of graphical representation, the display item setting page 213 is divided into upper, middle, and lower portions, which are shown in FIGS. 15A, 15B, and 15C, respectively. In the actual display, the upper, middle, and lower portions shown in FIGS. 15A, 15B, and 15C, respectively, are vertically combined to form the single display item setting page 213.

Referring to FIG. 15A, a list of items that are not set as display items with respect to the basic attribute is displayed in an area 2131a. On the other hand, a list of items that are set as display items with respect to the basic attribute is displayed in an area 2131b. A user can set any item as a display item and delete any item from display items by operating an ADD button 2131c and a DELETE (CANCEL) button 2131d.

Further, a list of items that are not set as items to be displayed when the attribute items are displayed with respect to the source type (READ) is displayed in an area 2132a. On the other hand, a list of items that are set as items to be displayed when the attribute items are displayed with respect to the source type (READ) is displayed in an area 2132b. A user can set any item as a display item and delete any item from display items by operating an ADD button 2132c and a DELETE (CANCEL) button 2132d.

With respect to the source type (PDL), the target type (PAPER OUTPUT), the target type (STORAGE), the target type (LINE/LAN), etc., the items to be displayed (display items) may also be increased and decreased by the same operations. Referring to FIG. 15B, a list of items that are not selected as display items with respect to the source type (PDL) is displayed in an area 2133a, and a list of display items for the source type (PDL) is displayed in an area 2133b. A user can set any item as a display item and delete any item from display items by operating an ADD button 2133c and a DELETE (CANCEL) button 2133d. Further, a list of items that are not selected as display items with respect to the source type (PAPER OUTPUT) is displayed in an area 2134a, and a list of display items for the source type (PAPER OUTPUT) is displayed in an area 2134b. A user can set any item as a display item and delete any item from display items by operating an ADD button 2134c and a DELETE (CANCEL) button 2134d. Referring to FIG. 15C, a list of items that are not selected as display items with respect to the target type (STORAGE) is displayed in an area 2135a, and a list of display items for the target type (STORAGE) is displayed in an area 2135b. A user can set any item as a display item and delete any item from display items by operating an ADD button 2135c and a DELETE (CANCEL) button 2135d. Further, a list of items that are not selected as display items with respect to the target type (LINE/LAN) is displayed in an area 2136a, and a list of display items for the target type (LINE/LAN) is displayed in an area 2136b. A user can set any item as a display item and delete any item from display items by operating an ADD button 2136c and a DELETE (CANCEL) button 2136d.

The log information in the log information storage part 103 of the log management server 10 may be configured, for example, as follows.

Figure 16:
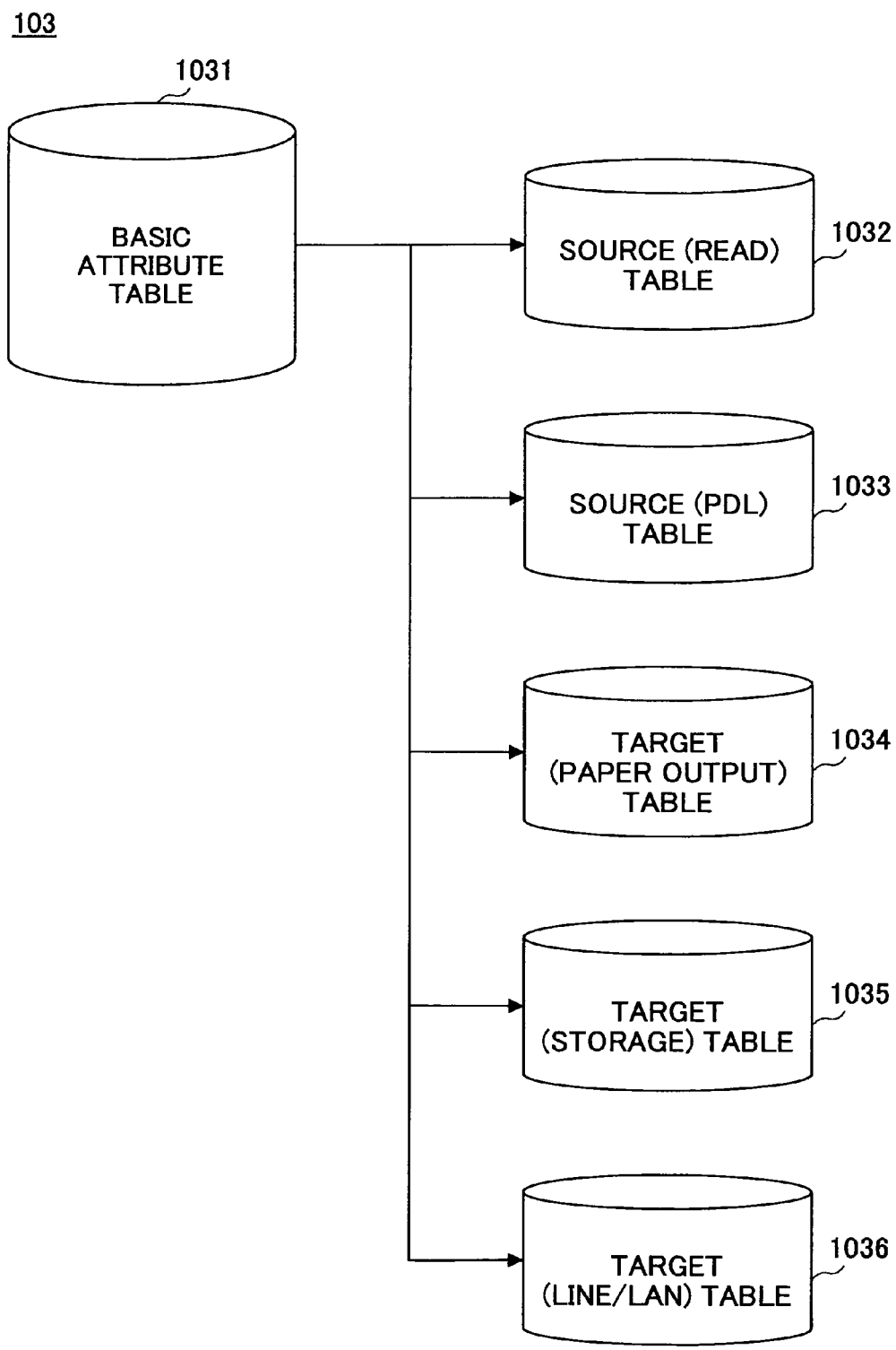
FIG. 16 is a diagram showing a configuration of a log information storage part according to the embodiment of the present invention.

FIG. 16 is a diagram showing a configuration of the log information storage part 103.

Referring to FIG. 16, a basic attribute table 1031 stores the basic attributes of each job. A source (READ) table 1032 stores the attribute items corresponding to the source type (READ) with respect to a job whose source type is READ. A source (PDL) table 1033 stores the attribute items corresponding to the source type (PDL) with respect to a job whose source type is PDL.

A target (PAPER-OUTPUT) table 1034 stores the attribute items corresponding to the target type (PAPER OUTPUT) with respect to a job whose target type is PAPER OUTPUT. A target (STORAGE) table 1035 stores the attribute items corresponding to the target type (STORAGE) with respect to a job whose target type is STORAGE. A target (LINE/LAN) table 1036 stores the attribute items corresponding to the target type (LINE/LAN) with respect to a job whose target type is LINE/LAN.

That is, the basic attributes of all jobs are stored in the basic attribute tables 1031, while in each of the other tables 1032 through 1036, the attribute items of only a job related thereto are stored. The basic attribute table 1031 may be correlated with the other tables 1032 through 1036 through an ID assigned to each job.

As described above, according to the log management server 10 of this embodiment, it is possible to create the job list page 211 that can display one or more attribute items for each source type or each target type. Accordingly, it is possible to provide log information in a visually user-friendly form and manner.

In the above-described embodiment, a description is given of the case where the log management server 10 causes log information collected from the multifunction machine 30 to be viewed or browsed. Alternatively, the multifunction machine 30 may directly cause log information to be viewed or browsed. A description is given below of a configuration in such a case.

Figure 17:
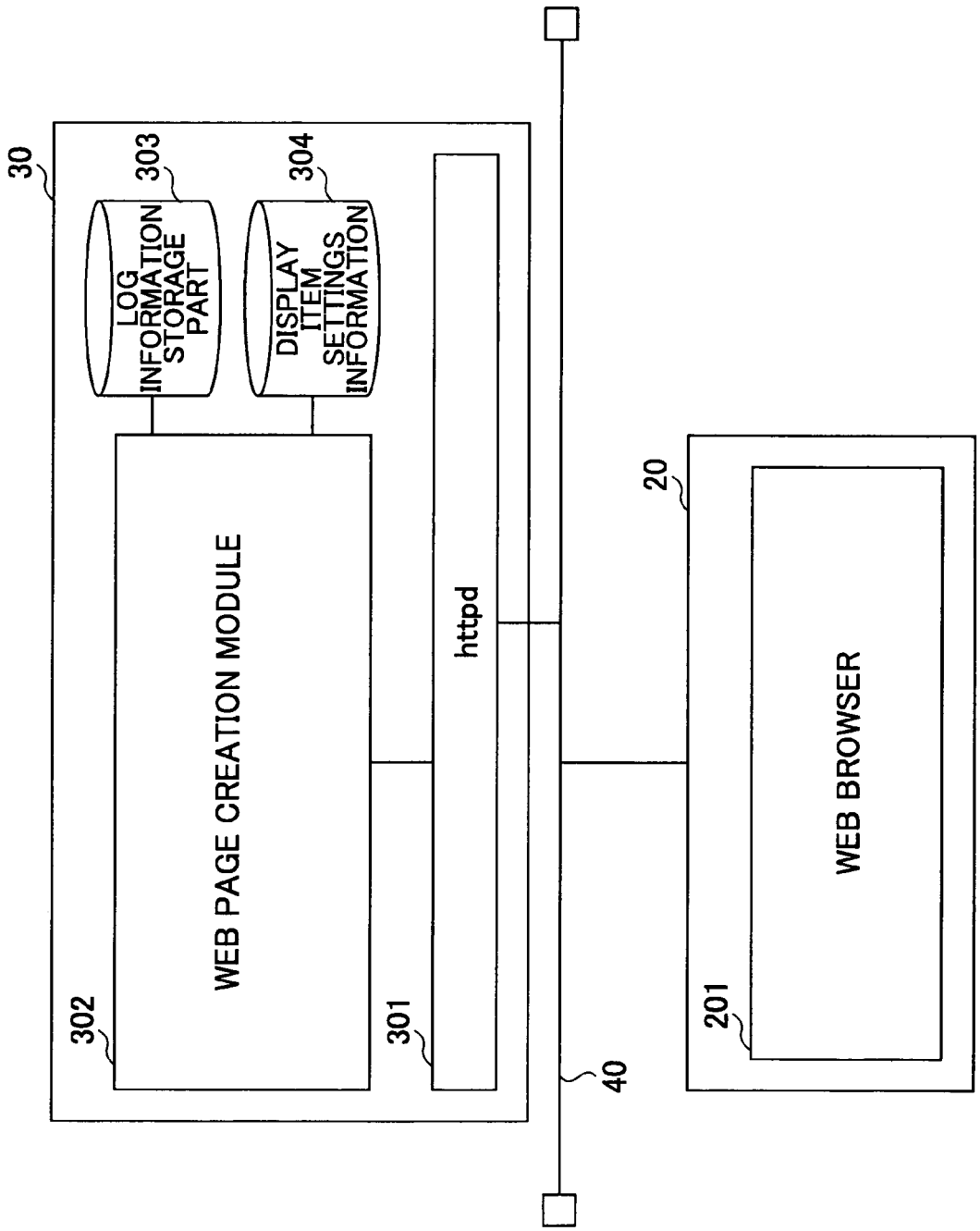
FIG. 17 is a diagram showing a functional configuration of a multifunction machine in the case where the multifunction machine causes log information to be viewed or browsed according to the embodiment of the present invention.

FIG. 17 is a diagram showing a functional configuration of the multifunction machine 30 in the case where the multifunction machine 30 causes log information to be viewed or browsed.

Referring to FIG. 17, the multifunction machine 30 includes an httpd 301, a Web page creation module 302, a log information storage part 303, and a display item settings information 304. The httpd 301, the Web page creation module 302, the log information storage part 303, and the display item settings information 304 correspond to the httpd 101, the Web page creation module 102, the log information storage part 103, and the display item settings information 104 of FIG. 3. That is, the multifunction machine 30 performs the same information processing as the log management server 10, thereby providing the job list page 211, etc., to the Web browser 201. The log information storage part 303 may store only log information related to a job that has occurred in the multifunction machine 30. Further, the log information storage part 303 may also store log information collected from another multifunction machine 30. Further, the multifunction machine 30 may cause the job list page 211 to be displayed on not only the Web browser 201 through the network 40 but also the operations panel of the multifunction machine 30.

Thus, according to embodiments of the present invention, it is possible to provide a job information display controller (or control unit), a job information display control method, and a job information display control program product that can display the job information of an apparatus in an easily understandable manner, and a recording medium on which a program for causing a computer to execute such a job information display control method is recorded.

The present invention is not limited to the specifically disclosed embodiment, and variations and modifications may be made without departing from the scope of the present invention.

The present application is based on Japanese Priority Patent Application No. 2005-244345, filed on Aug. 25, 2005, the entire contents of which are hereby incorporated by reference.

What is claimed is:

1. A controller, including a processor, for controlling a display of list information of one or more jobs executed in one or more apparatuses on a display unit, wherein:

with respect to a specified one of display items of the list information of the jobs, the display items each having one or more classifications and having one or more attribute items determined independently for each of the classifications, the display items being displayed for each of the jobs, a selection field for selecting one of the classifications is displayed in a display condition where the specified one of the display items is indicated in a first area and the classifications of the specified one of the display items are displayed in a second area different from the first area; and a screen is generated by reading the attribute items corresponding to the one of the classification selected in the selection field so that at least the second area is expanded on the screen in accordance with the one of the classifications selected in the selection field, and the attribute items not displayed before the expansion of the second area are displayed in the expanded second area on the screen with respect to one or more of the jobs related to the selected one of the classifications; and wherein some of the jobs have multiple target types corresponding to respective plural output destinations to which the jobs output information, and wherein the processor is configured to cause separate lines to be displayed for the respective target types in the expanded second area, such that some of the jobs are associated with multiple target type lines in the expanded second area, and such that each of the lines refers to one of the target types.

2. The controller as claimed in claim 1, wherein: the area of the specified one of the display items is expanded in accordance with the one of the classifications selected in the selection field; and the expanded area is blank with respect to one or more of the jobs that are unrelated to the selected one of the classifications.

3. The controller as claimed in claim 1, wherein one or more of the display items that are common to the jobs and remain unchanged irrespective of the classifications of the specified one of the display items are displayed along with the specified one of the display items.

4. The controller as claimed in claim 1, wherein the display of the list information of the one or more jobs executed in the apparatuses connected through a network is controlled.

5. The controller as claimed in claim 1, wherein: the specified one of the display items is related to types of sources of information input to the jobs; and the area of the specified one of the display items is expanded in accordance with one of the types of the sources selected in the selection field, and the attribute items corresponding to the selected one of the types of the sources are displayed in the expanded area with respect to one or more of the jobs related to the selected one of the types of the sources.

6. The controller as claimed in claim 1, wherein: the specified one of the display items is related to types of output destinations of information output from the jobs; and the area of the specified one of the display items is expanded in accordance with one of the types of the output destinations selected in the selection field, and the attribute items corresponding to the selected one of the types of the output destinations are displayed in the expanded area with respect to one or more of the jobs related to the selected one of the types of the output destinations.

7. The controller as claimed in claim 1, wherein the selection field is displayed in response to an operation on the first area so that a list of the classifications corresponding to the specified one of the display items indicated in the first area is displayed in the selection field.

8. A method for controlling a display of list information of one or more jobs executed in one or more apparatuses on a display unit, wherein:

with respect to a specified one of display items of the list information of the jobs, the display items each having one or more classifications and having one or more attribute items determined independently for each of the classifications, the display items being displayed for each of the jobs, a selection field for selecting one of the classifications is displayed in a display condition where the specified one of the display items is indicated in a first area and the classifications of the specified one of the display items are displayed in a second area different from the first area; and a screen is generated by reading the attribute items corresponding to the one of the classification selected in the selection field so that at least the second area is expanded on the screen in accordance with the one of the classifications selected in the selection field, and the attribute items not displayed before the expansion of the second area are displayed in the expanded second area on the screen with respect to one or more of the jobs related to the selected one of the classifications; and wherein some of the jobs have multiple target types corresponding to respective plural output destinations to which the jobs output information, and wherein the method includes the step of displaying separate lines for the respective target types in the expanded second area, such that some of the jobs are associated with multiple target type lines in the expanded second area, and such that each of the lines refers to one of the target types.

9. The method as claimed in claim 8, wherein: the area of the specified one of the display items is expanded in accordance with the one of the classifications selected in the selection field; and the expanded area is blank with respect to one or more of the jobs that are unrelated to the selected one of the classifications.

10. The method as claimed in claim 8, wherein one or more of the display items that are common to the jobs and remain unchanged irrespective of the classifications of the specified one of the display items are displayed along with the specified one of the display items.

11. The method as claimed in claim 8, wherein the display of the list information of the one or more jobs executed in the apparatuses connected through a network is controlled.

12. The method as claimed in claim 8, wherein: the specified one of the display items is related to types of sources of information input to the jobs; and the area of the specified one of the display items is expanded in accordance with one of the types of the sources selected in the selection field, and the attribute items corresponding to the selected one of the types of the sources are displayed in the expanded area with respect to one or more of the jobs related to the selected one of the types of the sources.

13. The method as claimed in claim 8, wherein: the specified one of the display items is related to types of output destinations of information output from the jobs; and the area of the specified one of the display items is expanded in accordance with one of the types of the output destinations selected in the selection field, and the attribute items corresponding to the selected one of the types of the output destinations are displayed in the expanded area with respect to one or more of the jobs related to the selected one of the types of the output destinations.

14. The method as claimed in claim 8, wherein the selection field is displayed in response to an operation on the first area so that a list of the classifications corresponding to the specified one of the display items indicated in the first area is displayed in the selection field.

15. A program product for causing a computer to execute the method as set forth in claim 8.

16. A non-transitory computer-readable recording medium on which a program for causing a computer to execute the method as set forth in claim 8 is recorded.

* * * * *